March 27, 1962     F. L. JONACH     3,026,722
AUTOMATIC CONTROL SYSTEM
Filed Dec. 17, 1958     9 Sheets-Sheet 1

Fredrick Lowell Jonach    Inventor

By W. O. Hallman   Attorney

March 27, 1962  F. L. JONACH  3,026,722
AUTOMATIC CONTROL SYSTEM
Filed Dec. 17, 1958  9 Sheets-Sheet 2

Fredrick Lowell Jonach  Inventor

By W O Heilman  Attorney

March 27, 1962 F. L. JONACH 3,026,722
AUTOMATIC CONTROL SYSTEM
Filed Dec. 17, 1958 9 Sheets-Sheet 4

Fig. 7

Fredrick Lowell Jonach Inventor

By W.O. T Heilman Attorney

Fig. 8

Fredrick Lowell Jonach  Inventor

March 27, 1962   F. L. JONACH   3,026,722
AUTOMATIC CONTROL SYSTEM
Filed Dec. 17, 1958   9 Sheets-Sheet 6

Fredrick Lowell Jonach   Inventor

By W. O. T Heilman   Attorney

Fredrick Lowell Jonach   Inventor

By W.O. Heilman   Attorney

Fredrick Lowell Jonach Inventor

United States Patent Office 3,026,722
Patented Mar. 27, 1962

3,026,722
AUTOMATIC CONTROL SYSTEM
Fredrick Lowell Jonach, Kew Gardens, N.Y., assignor to Esso Research and Engineering Company, a corporation of Delaware
Filed Dec. 17, 1958, Ser. No. 781,078
4 Claims. (Cl. 73—116)

This invention relates to a method and means for imposing automatic control on operating equipment and processes. It relates particularly to a method and means for imposing automatic control on operating equipment and processes in accordance with a previously determined and recorded program. It relates more particularly to such a method and means wherein and whereby the previously determined program is recorded by modulating the exposure of a moving strip of photographic film, and it relates still more particularly to the control of an internal combustion engine according to a previously determined and recorded program by a method and means of the character aforesaid.

In the testing of equipment or a process which must function through a range of operating conditions, it is often desirable to plan a test program or schedule of operating condition variations covering a certain period of time; operate the equipment or carry out the process according to the program; record the variations in positions or other extensively indicated values of the means whereby operating control is imposed on the equipment or process, and then by means of appropriate playback and actuating apparatus use the records so taken to operate the equipment or carry out the process repetitively according to the previously determined program. In this way a relatively short master test or recording run under human control will provide an input signal source for a long continued slave test or playback run under control of automatically operating apparatus.

The method whereby the original records are taken in the master test run will be an important consideration. One method which has been used is to generate voltage signals modulated in frequency according to variations in the values to be recorded, and use these signals as the input to a magnetic tape recording device. The tape record generated therein may be played back by means well known in the art to generate voltages which will be used as input signals to actuating apparatus whereby further operation of the machine or carrying out of the process under test is achieved. Magnetic tapes may be copied and joined end to end to form one very long tape; a single tape may have its ends joined to form a loop, or other methods resorted to whereby a record for indefinitely long playing back and correspondingly long testing of equipment or process is achieved. Likewise by making of record copies, playing back and testing in multiple and separated installations may be effected.

While the method of recording and playing back by means employing magnetic tapes has many conveniences and advantages, it does have at least some not entirely desirable aspects. When this method is employed around certain equipment such as a spark ignition type internal combustion engine, stray electrostatic discharge signals emanating from sources such as the spark plugs and the distributor may affect the fidelity of the recording. Further, the making of copies from a master magnetic tape is quite expensive, and further still there may be inadvertent wiping of the tape by misuse of the playback equipment or exposure to stray magnetic fields.

It is the general object of this invention to provide a system for controlling operating equipment and processes automatically according to a predetermined program using a recording and playback method and means employing photographic film rather than magnetic tape or any other signal storage material, which will not only take a faithful record of input signals and give back an accurate reproduction thereof, but also be characterized by lack of susceptibility to taking any record of signals from uncontrolled and unintended sources, ease of multiple copying of the record, and resistance of the record to spoilage during use or storage. Within the scope of this general object, it is a particular object of this invention to provide a method and means of automatic control employing a photographic film record wherein and whereby dynamometric testing of an internal combustion engine may be performed for an indefinitely continued period.

When photographic film is exposed and then developed to a negative it will have a characteristic known as density. This is a measure of the light transmitting ability of the negative. A negative of high density will be dark gray or black in appearance, and will transmit light only with substantial attenuation. A negative of low density, on the other hand, will be light gray or clear white, and will transmit light relatively freely. Between these extremes lies a continuous range of conditions of appearance and ability to transmit light. Appearance or tonal values are measured against a standard photographic reference known as a "gray scale" which is a strip of tones, often given in ten steps, ranging from white to black.

The density of a negative of any given photographic film material will be a function of three major variables. These are durable of exposure, intensity of exposure, and developing time, assuming a given strength of the developing agent. If duration of exposure and developing time for all parts of a given film strip be fixed, negative density may then be made a function of exposure intensity only.

According to this invention, a moving strip of photographic film is exposed to at least one light source whose intensity is varied according to a previously determined or independent variable. Where more than one light source is used, the mechanical and optical arrangement is such to form a plurality of exposure tracks along the film. The film is then developed to a negative having a continua of densities modulated according to the variations of intensities of the light sources to which the film was previously exposed. With densities established on the negative, a film print may be made therefrom according to methods well known in the art, which print will be a positive in respect of the brilliance of the light source or sources whereby the original exposure was effected.

After development and any other necessary and conventional dark room operations, the film positive is run through a projection which is aligned optically with a photoelectric cell or cells in a number or groups corresponding to the exposure tracks. Light from the projector passing through the positive and impinging on these cells will vary in intensity inversely with the transmission density of the film, and, accordingly, so will the voltages generated by these cells. The output voltage signals of the photoelectric cells will thus be functions of the variables in respect of which the intensities of the light sources for film exposure were controlled. The photoelectric cell output signals may be amplified by means well known in the art to power levels at which they may serve as controls for a piece of operating equipment or a process.

It should be borne in mind that the original film negative may be passed through the projector in which case likewise the voltages developed by the photoelectric cells will be functions of the variables in respect of which the intensities of the light sources for film exposure were controlled, although, of course, inverse to the functions obtaining with the film positive. As a practical matter, however, it may be desirable to retain the originally exposed film negative as a master from which a plurality of positives can be made.

The nature and substance of this invention may be more clearly perceived and fully understood by referring to the following description and claims taken in connection with the accompanying drawings in which:

Figure 1:
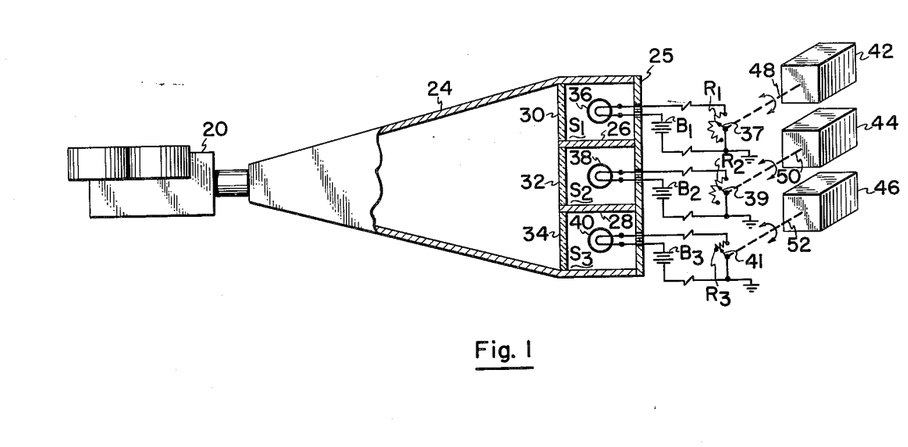
FIG. 1 represents a partially schematic, partially sectioned plan view of a photographing apparatus whereby a moving strip of film is exposed to a plurality of light sources of variable intensities.
Figure 2:
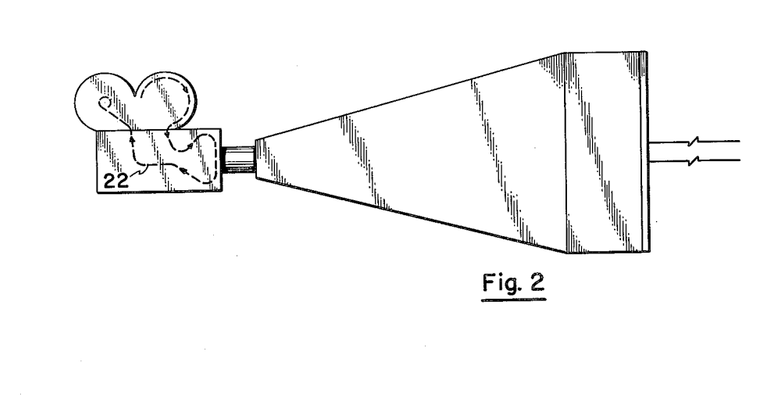
FIG. 2 represents an elevation view of part of the apparatus of FIG. 1.

Referring now to the drawings, in FIGS. 1 and 2 a motion picture camera is designated 20, and through it is passing film strip 22. The camera is aligned and fitted with a light shield 24. At the end removed from the camera, shield 24 is provided with an opaque back wall member 25 and two opaque partition members 26 and 28. Between these partitions and the lateral interior wall surfaces of the light shield are provided three ground glass plates 30, 32, and 34 which are, in effect, windows or screens observed by the camera.

Three compartments $S_1$, $S_2$, and $S_3$ are formed by the shield walls, the partitions and the ground glass plates, and each contains at least one incandescent lamp, severally designated 36, 38, and 40. Each of these lamps is connected in an electric circuit containing a voltage source such as a battery, and a means such as a variable resistor or rheostat whereby the voltage across the lamp terminals and, therefore, the lamp brightness or luminous intensity may be regulated. The several lamp batteries are designated $B_1$, $B_2$, and $B_3$, and the several lamp rheostats comprise resistors $R_1$, $R_2$, and $R_3$ with sliders 37, 39, and 41.

Associated with each lamp circuit is a rheostat control means. Such means may be any machine or system having an operating variable whose value can be indicated extensively, as, for example, by the angular position of a shaft. These means are designated generally in FIG. 1 by the diagrammatic blocks 42, 44, and 46. Each of these means is characterized by an operating variable indicator shaft, severally designated 48, 50, and 52, connected to drive the slider of a lamp rheostat. It may be seen, therefore, that the luminous intensity of lamp 36, for example, will be a function of whatever operating variable of machine or system 42 it is whose value is indicated by the angular position of shaft 48.

As film strip 22 is reeled through camera 20 it will be exposed to and by the ground glass plates 30, 32, and 34 observed by the camera. These plates will be illuminated according to the intensities of lamps 36, 38, and 40, respectively. Film 22 will record three parallel continuous photographic images of the glass plates which may be thought of as exposure tracks. The intensity of exposure at any point on any track will be a function of the brilliance of the corresponding ground glass plate at the time of exposure of that point, and hence of the value of the system or machine operating variable whereby the voltage across the lamp illuminating this glass plate is regulated.

At the end of a recording run, exposed film 22 is taken from camera 20 for dark room processing. Initial processing, as by a continuous developing machine, will yield a negative film strip; that is, one on which relatively dark areas will correspond to relatively bright plates 30, 32, and 34, and vice versa. For the reason aforestated, however, it may be desirable to use the film negative for printing a film positive, the latter being specifically a film strip on which relatively light areas correspond to relatively bright plates 30, 32, and 34.

Figure 3:
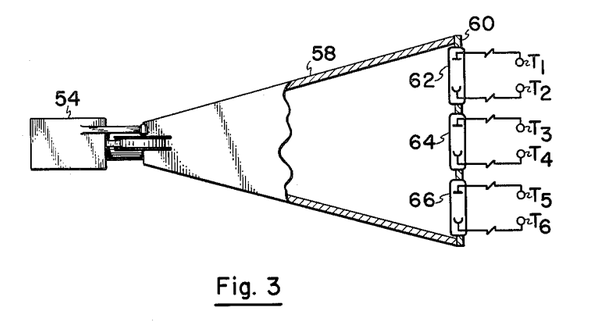
FIG. 3 represents a partially schematic, partially sectioned plan view of a projecting apparatus whereby light is transmitted through a positive print of film exposed by the apparatus of FIGS. 1 and 2 and subsequently developed to a negative, this light impinging upon a plurality of photoelectric cells whereby voltage signals are developed.
Figure 4:
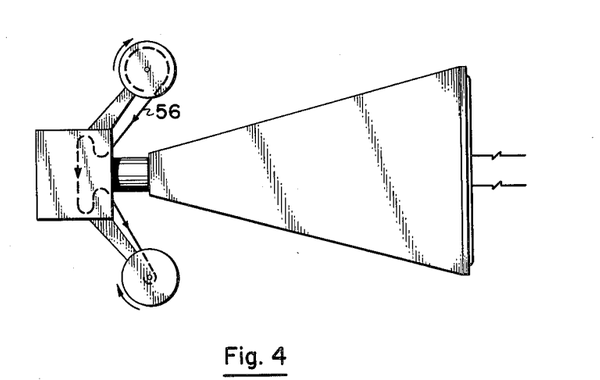
FIG. 4 represents an elevation view of part of the apparatus of FIG. 3.

Referring next to FIGS. 3 and 4, 54 designates a motion picture projector, and 56 the film passing through it. This film is here taken as at least one positive print of film 22 exposed in and by the apparatus of FIGS. 1 and 2 and subsequently developed as a negative. Film 56 may comprise a plurality of positive prints of the developed negative of film 22 joined end to end to form a single long film strip for extended operation of the apparatus of FIGS. 3 and 4, or, further, it may comprise one or a plurality of positive prints joined in a loop to circulate through projector 54 for indefinite operation of the apparatus.

Projector 54 is aligned and fitted with a light shield 58. At the end removed from the projector, shield 58 is provided with an opaque back wall member 60 in which are set three photoelectric cells 62, 64, and 66 whose light sensitive surfaces are faced toward projector 54. The optical alignment of the photoelectric cells with respect to the projector corresponds with that of ground glass plates 30, 32, and 34 with respect to camera 20. Accordingly, projection light passing through the developed image track of plate 30 on film 56 will impinge upon cell 62; that passing through the track of plate 32 will impinge upon cell 64, and that passing through the track of plate 34 will impinge upon cell 66. Leading away from each photoelectric cell are two wires which in their several pairs have terminals $T_1$ and $T_2$, $T_3$ and $T_4$, and $T_5$ and $T_6$.

The voltage developed by cell 62 in response to light from projector 54 impinging upon its sensitive surface will appear across terminals $T_1$ and $T_2$; that developed by cell 64 will appear across terminals $T_3$ and $T_4$, and that developed by cell 66 will appear across terminals $T_5$ and $T_6$.

The magnitude of the voltage developed by any photoelectric cell will vary with the intensity of the light impinging upon it, the more intense the light the higher the voltage. Taking cell 62 as an example, the intensity of light impinging upon it will be a function of the transmission density of that part of the film positive 56 through which this light must pass, specifically the density of the image track of ground glass plate 30. Where this track is quite dense, both the intensity of light impinging upon cell 62 and the voltage developed across $T_1$ and $T_2$ will be comparatively low. On the other hand, where the image track of plate 30 has a low density the light impinging upon cell 62 will be relatively intense, and the voltage across terminals $T_1$ and $T_2$ comparatively high.

A dense image track of ground glass plate 30 on film positive 56 corresponds to a weak exposure of part of film 22 by light reaching it from plate 30. This corresponds in turn to a low voltage impressed on lamp 36. Considering electrical inputs to and outputs from the entire photographing and projection or recording and playback system of FIGS. 1, 2, 3, and 4, therefore, it may be seen that low voltages impressed on lamps 36, 38, and 40 will yield low voltages across terminal pairs $T_1$ and $T_2$, $T_3$ and $T_4$, and $T_5$ and $T_6$. As voltages on the lamps are increased, so will be the voltages available across the terminal pairs. By proper design and selection of system components according to principles well known in the art, changes in angular positions of shafts 48, 50, and 52 whereby changes in values of operating variables of machines or systems 42, 44, and 46 are extensively indicated may be reproduced linearly by variations in the voltages available across photoelectric cell output terminal pairs $T_1$ and $T_2$, $T_3$ and $T_4$, and $T_5$ and $T_6$.

Figure 5:
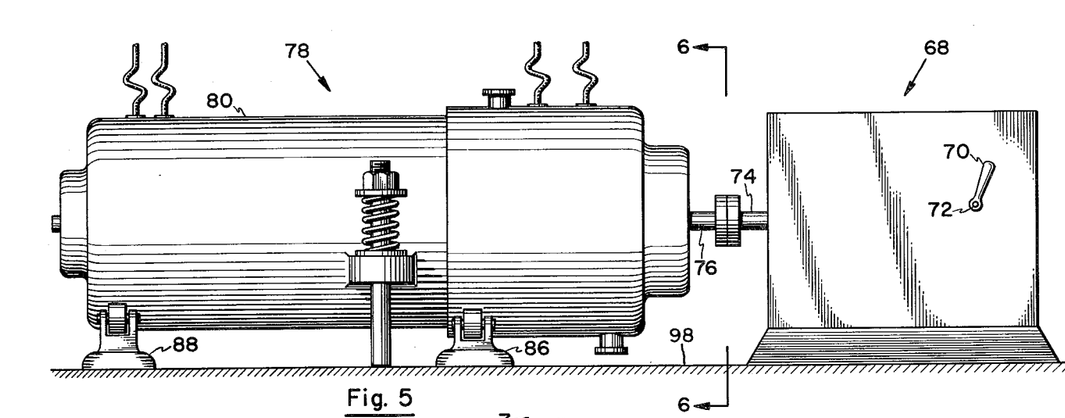
FIG. 5 represents a side elevation view in mechanical component form of an internal combustion engine connected to an eddy current dynamometer for operational testing.
Figure 6:
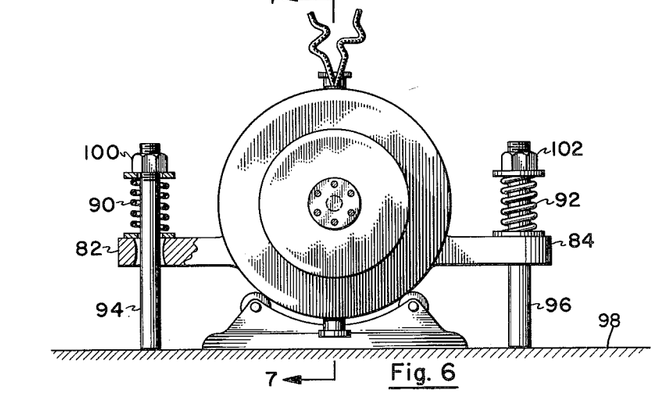
FIG. 6 represents an end elevation view of the eddy current dynamometer of FIG. 5 taken along the line 6—6 of FIG. 5.

Referring next to FIGS. 5 and 6, 68 designates an internal combustion engine having a throttle lever 70, a throttle lever shaft 72, and an output shaft 74. The engine shaft is coupled to shaft 76 of an eddy current dynamometer 78. As will be made apparent presently, eddy current dynamometer 78 is of a kind which may either absorb power from engine 68 or supply power to the engine. The latter utilization of the dynamometer would correspond to motoring of an engine in the course of starting or in an automobile going down hill.

Dynamometer 78 is characterized by a frame 80 and a pair of balance arms 82 and 84 oppositely disposed on the frame. It is supported by a pair of roller cradles 86 and 88. Bearing upon the upper surfaces of the balance arms are two compression springs 90 and 92. These springs surround tension posts 94 and 96 which are provided with suitably firm anchorage in the supporting floor structure 98, and pass upwardly through clearance holes in balance arms 82 and 84. The tension posts are threaded at their upper ends to receive adjusting nuts 100 and 102 whereby initial compression is set on springs 90 and 92. By this roller cradle, balance arm, and spring arrangement, dynamometer frame 80 is given a slight amount of rotational freedom. The frame will tend to turn one way or the other depending upon whether the dynamometer is absorbing power from or supplying power to engine 68. Angular deflection of frame 80 in cradles 86 will be a measure of torque.

Figure 7:
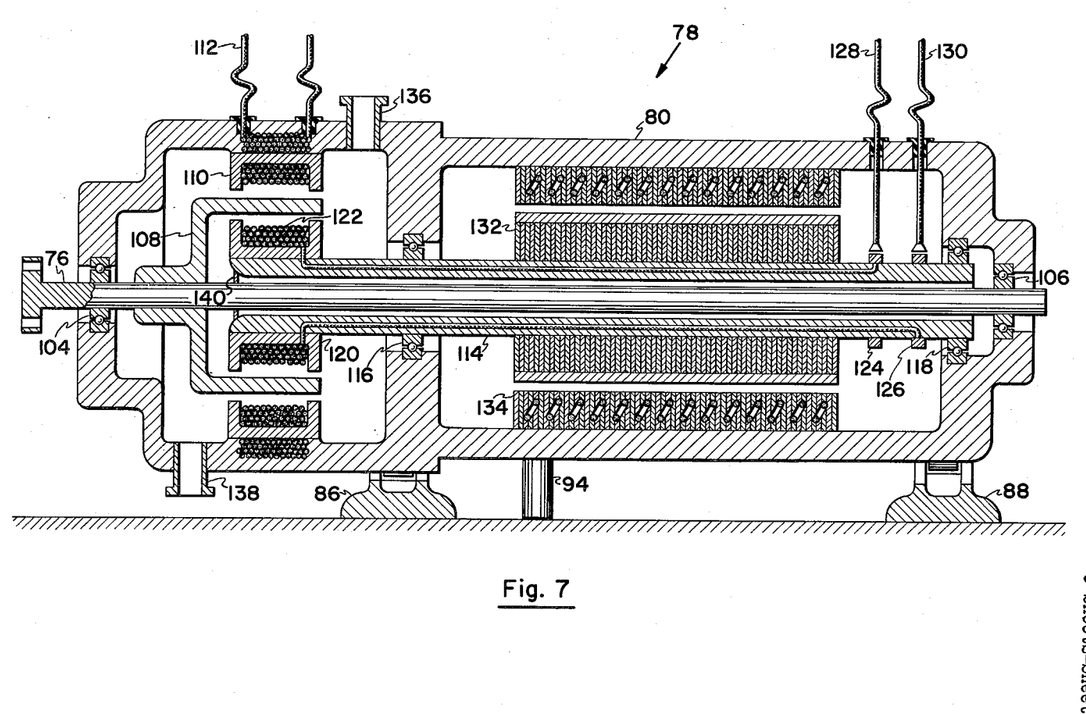
FIG. 7 represents a side elevation view of the eddy current dynamometer of FIGS. 5 and 6 taken in section along line 7—7 of FIG. 6.

Referring next to FIG. 7, dynamometer shaft 76 is supported in bearing sets 104 and 106 retained in frame 80. Fitted fixedly to the shaft, which may itself be of any grade of steel or other material suitable for use as shafting in rotating electrical machinery, is a flanged or cup-like disc 108 which must be of a material such as soft iron having a high magnetic permeability. Set in frame 80 adjacent the flange periphery of disc 108 are a series of C-shaped magnetically permeable pole pieces 110 each having a magnetizing winding of insulated wire 112. The leads of these several windings may be joined electrically as appropriate and taken to a common current source.

Enclosing shaft 76 for at least a portion of its length is a sleeve 114 which is supported in bearing sets 116 and 118 retained in frame 80. At its end adjacent disc 108 the sleeve is fixedly fitted with a series of C-shaped magnetically permeable pole pieces 120. Around these pole pieces is a magnetizing winding of insulated wire 122 whose ends are taken longitudinally through sleeve 114 to slip rings 124 and 126 nearby bearing 118. External electrical connection is made to these slip rings through insulated leads 128 and 130 which terminate in brushes of a conventional nature running on the rings.

Fixedly mounted on sleeve 114 between bearing 116 and slip ring 124 is the rotor structure 132 for an induction motor. Such structure may take several forms. One of these is that of copper bars embedded in slots in a laminated iron core, and connected at each end of the rotor by copper rings. Set in frame 80 adjacent the periphery of rotor structure 132 is an induction motor stator structure 134. This compises a three-phase Y or delta-connected winding embedded in the slots of a laminated iron core. The leads coming off of this stator structure should be considered as having appropriate electrical connection in either Y or delta, and supplied from an appropriate source of A.C. power, for example, a source at 440 volts.

The induction motor comprising rotor structure 132 and stator structure 134 may be air cooled while the region of the eddy current dynamometer to the left of bearing 116 may be liquid cooled. Conduit 136 is a means of cooling liquid or water supply, and conduit 138 is a means of cooling water discharge. The cooling water carries away heat from windings 112 and 122, and particularly from the flange element of disc 108. Bearings 104 and 116 should be considered as sealed to prevent water flow through them out along shaft 76 or in to the induction motor apparatus, and a rotating seal 140 is provided between shaft 76 and sleeve 114.

The eddy current dynamometer is an article of commerce. For an example of a machine generally similar to the one just described, reference may be had to catalog GBI (August 1952) of the Dynamatic Corporation (a subsidiary of the Eaton Mfg. Co.) of Kenosha, Wis. At page 13 of this catalog is illustrated and described the "Universal Dynamometer" which it is said combines the functions of motoring and absorption in one machine cradled in trunnion bearings.

The principles of operation of the eddy current dynamometer will now be considered. Suppose that internal combustion engine 68 is still, and that there is a direct current flowing through coils 112 but no current flowing through coil 122. A field of magnetic flux will be set up between the north and south faces of pole pieces 110, the lines of which flux will pass at least in part through the magnetically permeable flange material of disc 108. Now suppose that engine 68 is fired to commence rotation of shaft 76 and disc 108. There will be relative movement of the lines of magnetic flux in the disc flange which will create eddy currents therein. These currents will develop a second magnetic field whose strength will be determined by the strength of the primary field owing to the current in coils 112 and by the relative speed between disc 108 and pole pieces 110.

There will be attraction between the primary and secondary magnetic fields, the overcoming of which will require the exertion of engine torque on shaft 76. For a given speed, this torque will increase with increasing current in coils 112. Power developed by the engine appears as heating of disc 108. The disc is prevented from overheating by water flowing into the dynamometer through conduit 136 and out through conduit 138.

Suppose next that the engine is still, and that there is a direct current flowing through coil 122 but no current flowing through coils 112. Suppose further that current is supplied to the stator structure 134 of the induction motor to commence turning of the rotor structure 132 and sleeve 114 carrying pole pieces 120, coil 122, and slip rings 124 and 126. According to principles stated already, there will be a torque exerted on the flange element of disc 108 which will be transmitted back through shaft 76 to engine 68 to motor the engine.

The induction motor element of the eddy current dynamometer will be an essentially constant speed device. For a given speed of this motor, the tightness of coupling between pole pieces 120 and disc 108 and hence the motoring speed of disc 108 and engine 68 will increase with increasing current in coil 122. With the direct connection between engine 68 and disc 108 as shown, the engine cannot, of course, be motored at a speed greater than that of the induction motor itself with no firing impulses in the engine cylinders. The difference in speed between disc 108 and pole pieces 120 is called slip.

Pure motoring of the engine with no cylinders firing corresponds only to starting conditions or to downhill operation of an automotive vehicle under the action of gravity alone. Motoring of the engine with simultaneous firing impulses corresponds to down hill operation of an automotive vehicle under its own power. Speeding up of the engine under its own power might bring disc 108 to a higher speed than pole pieces 120, in which case the eddy current torque conditions would reverse with the engine trying to overspeed the induction motor and drive it as a generator. This would, however, correspond to no practical operating condition. Likewise, acceleration of the engine by action of the induction motor with coil 122 simultaneously with restraint of the engine by action of energized coils 112 would be an unrealistic operation. For this reason coils 112 and coil 122 do not carry current at the same time. There may, however, always be power to the stator element 134 of the induction motor whether or not coil 122 is energized.

Figure 8:
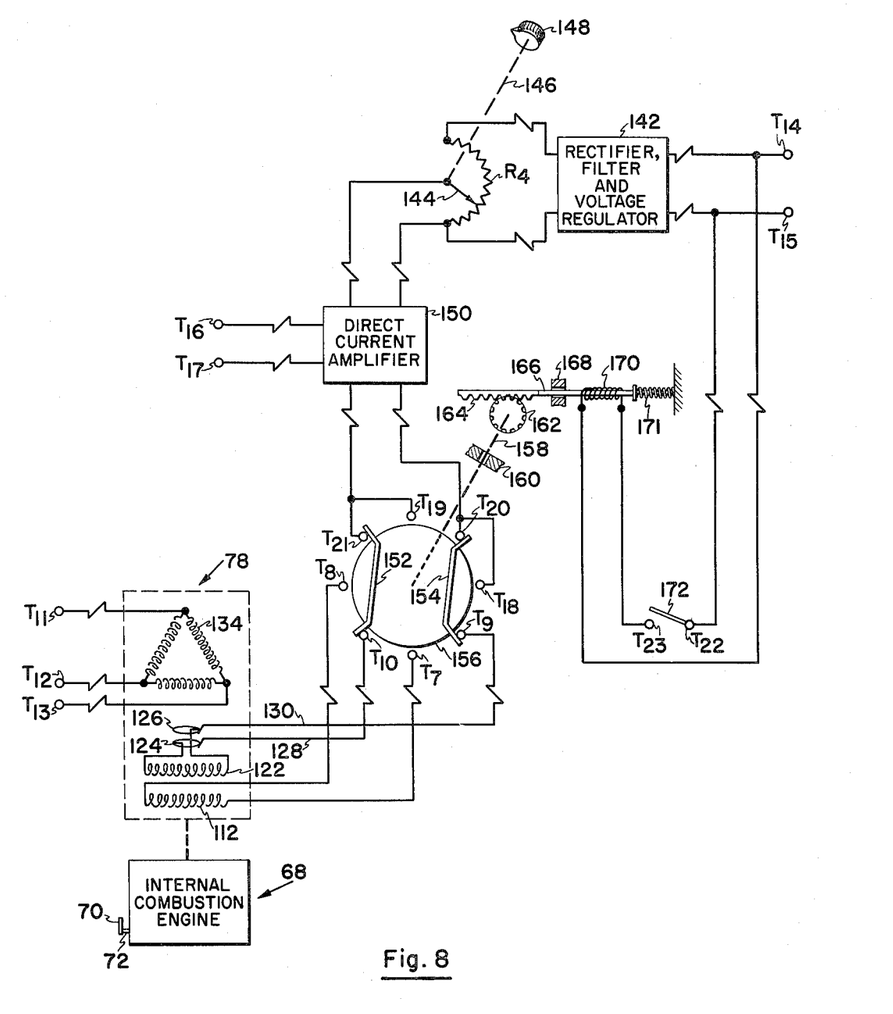
FIG. 8 represents a schematic diagram of the electrical and mechanical system for manually controlled operation of the internal combustion engine and eddy current dynamometer apparatus of FIG. 6.

Referring next to FIG. 8, what is shown is the electrical and mechanical system whereby the engine and dynamometer of FIG. 5 may be operated under manual control according to a predetermined program. This program may, for example, comprise a table of engine speeds and loads against time. The control means would be manipulated at times and to extents necessary to obtain the required engine performance according to instrumentation observable by the operator. It should be understood clearly, however, that determination of the operational program in and of itself does not constitute part of this invention.

Internal combustion engine 68, eddy current dynamometer 78, and their shaft connection are shown schematically. Within the dynamometer are indicated the magnetizing coils 112 and 122 for engine loading (power absorption) and engine motoring respectively. Also indicated in delta connection are the stator element windings 134 of the induction motor of the dynamometer. Power is supplied to the engine loading coils across terminals $T_7$ and $T_8$, and to the engine motoring coil across terminals $T_9$ and $T_{10}$. These terminals also function as switch points in the magnetizing coil current switching system to be described. Power is supplied to the induction motor across terminals $T_{11}$, $T_{12}$, and $T_{13}$ from a source not shown. Flow of air to engine 68 is regulated by throttle lever 70.

From a source not shown, an alternating voltage at a power level adequate for at least control signal purposes is supplied across input terminals $T_{14}$ and $T_{15}$ of a rectifier, filter, and voltage regulator unit 142. The direct voltage output of this device is impressed on a voltage divider apparatus comprising resistor $R_4$ and slider 144. This slider has an operating shaft 146 and an operating knob 148. Although truly a voltage divider rather than a rheostat, this apparatus will be shown to have the effective function of a rheostat in respect of regulation of current in the eddy current dynamometer magnetizing coils 112 and 122, and for convenience will be hereafter referred to as the magnetizing coil current rheostat. From the magnetizing coil current rheostat, therefore, a direct voltage of magnitude dependent on the rheostat setting is supplied to current amplifier 150. This amplifier also has an alternating voltage input supplied at a substantial power level across terminals $T_{16}$ and $T_{17}$ from a source not shown.

Current amplifier 150 may comprise a thyratron tube or gas filled triode. The alternating voltage from terminals $T_{16}$ and $T_{17}$ is imposed across plate and cathode elements of the tube while the direct voltage at signal level from the magnetizing coil current rheostat is applied to the grid element thereof. The connection from the rheostat to the grid must be such that the grid is made negative with respect to the cathode. Functionally a thyratron will pass only part of that half cycle of an alternating voltage signal which appears positive on its plate. How large a part of that half cycle will be passed will depend on how far negative the grid is driven with respect to the cathode. The more negative the grid, the higher the firing potential and the greater the tube output which may in this case be considered a pulsating direct current.

The output signal from current amplifier 150 appears across a terminal or point arrangement suitable for switching to send magnetizing current to either engine loading coils 112 or engine motoring coil 122. The amplifier output terminals for engine loading are $T_{18}$ and $T_{19}$, and those for engine motoring are $T_{20}$ and $T_{21}$. For circuit making and breaking purposes in the magnetizing coil current switching system to be described, these are matched with magnetizing coil input terminals or switch points $T_7$, $T_8$, $T_9$, and $T_{10}$.

Closure is made across the several terminal pairs to send current to either the engine motoring coil 122 by means of a magnetizing coil current switch comprising conducting elements 152 and 154 mounted in an electrically insulated fashion on disc 156 which is in turn fixedly mounted on shaft 158 rotatable in appropriate bearings 160, pinion 162 on the end of shaft 158 removed from disc 156, rack element 164 meshing with pinion 162, an extension 166 of the rack element slidably carried in appropriate guides 168 and being in the nature of a solenoid plunger element, and a solenoid coil 170. This apparatus is considered to be biased by means such as compression spring 171 abutting plunger 166 to maintain conducting elements 152 and 154 in contact respectively across terminal pairs $T_9$ and $T_{20}$ and $T_{10}$ and $T_{21}$ in the absence of a solenoid activating current in coil 170; that is, the magnetizing current circuit for engine motoring coil 122 is normally closed while that for engine loading coils 112 is normally open.

The electrical leads for coil 170 extend back to some source of power of sufficient level to furnish the coil current necessary to move plunger element 166 and rack 164 to the right, thus rotating disc 156 clockwise interrupting the magnetizing current circuit to the motoring coil 122, and bringing the conducting elements 152 and 154 into contact with the terminal pairs $T_7$ and $T_{18}$ and $T_8$ and $T_{19}$ for completion of the magnetizing current circuit to the loading coils 112. In FIG. 8 solenoid coil 170 is shown connected across terminals $T_{14}$ and $T_{15}$ which have been stated previously to be supplied with alternating voltage at a power level adequate for at least control signal purposes from a source not shown. It is not critical that coil 170 be supplied from this particular source so long as whatever source is used is adequate in respect of the coil current requirement just recited. What is important is that the leads for coil 170 have an interrupting means such as the manually operable magnetizing coil current switching solenoid circuit switch lever 172 cooperating with terminals $T_{22}$ and $T_{23}$ whereby the current circuit through coil 170 may be made or broken.

In summary, therefore, the control means of the engine test system of FIG. 8 susceptible to manipulation are the engine throttle lever 70, the magnetizing coil current rheostat knob 148, and the magnetizing coil current switching solenoid circuit switch lever 172. As noted earlier, these controls will be manipulated at times and to extents necessary to obtain the required engine performance on the basis of a predetermined program according to instrumentation observable by the operator. The actual modes of manipulation of these controls during any given engine test do not, however, in and of themselves constitute part of this invention.

Figure 9:
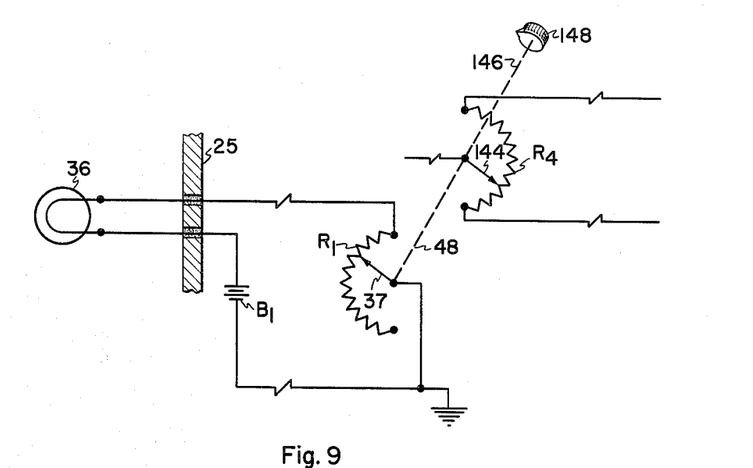
FIG. 9 represents a schematic diagram of the electrical and mechanical system for illumination intensity control of a film exposure lamp of the apparatus of FIG. 1 according to the position of the dynamometer magnetizing coil current rheostat of the apparatus of FIG. 8.

Referring next to FIG. 9, the magnetizing coil current rheostat of FIG. 8 is shown coupled mechanically to the voltage regulating means for film exposure lamp 36 of FIG. 1 according to the practice of this invention. Specifically, shaft 48 is taken as a torque transmitting extension of rheostat operating shaft 146 to tie together the actions of rheostat slider 144 and rheostat slider 37. It will be recalled from the discussion of FIG. 1 that a rheostat control means is associated with each lamp circuit, and that such means may be any machine or system having an operating variable whose value can be indicated extensively, as, for example, by the angular position of a shaft. In FIG. 1 the means for control of the rheostat in the circuit of lamp 36 is designated generally by the diagrammatic block 42 having an operating variable indicator shaft 48. Considering FIGS. 1, 8, and 9 together, therefore, it may be seen that in the engine test example here given block 42 represents the magnetizing coil current regulating system for either the engine loading coil current or the engine motoring coil current. Which current it will be at any given time will, of course, depend on the action of the magnetizing coil current switching system.

Since shaft 48 comprises a rigid extension of shaft 146, there will be a particular setting of slider 37 on resistor $R_1$ for any given setting of slider 144 on resistor $R_4$. Accordingly, considering the discussion of FIGS. 1 and 2, a particular voltage will be generated across the output terminals $T_1$ and $T_2$ of photoelectric cell 62 for a particular setting of slider 144. Considering the linear relation between the angular positions of sliders 144 and 37, and considering that by proper design and selection of system components the output voltage across terminals $T_1$ and $T_2$ may be made a linear function of the angular position of slider 37, a linear relation may be and accordingly is considered to exist between the angular position of slider 144 and the photoelectric cell output voltage across terminals $T_1$ and $T_2$. Be it noted that the existence of this linear relation is in no way dependent upon the nature of the relation between the setting of slider 144 and the current in either the engine loading coils 112 or the engine motoring coil 122.

Figure 10:
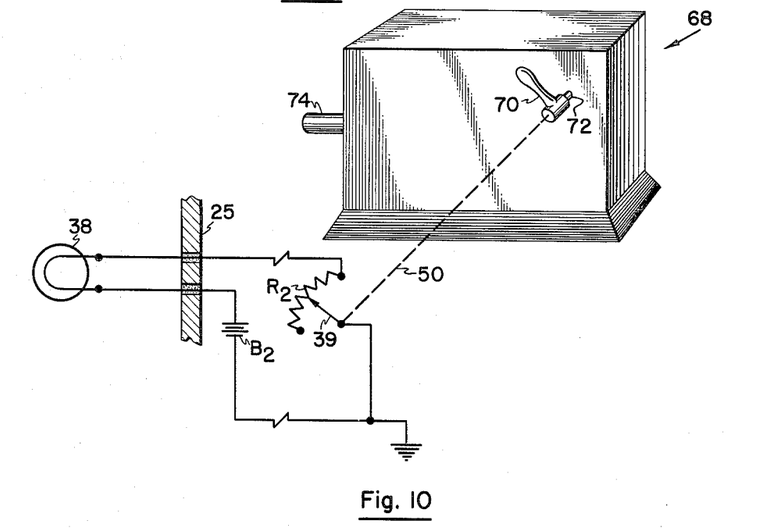
FIG. 10 represents a schematic diagram of the electrical and mechanical system for illumination intensity control of a film exposure lamp of the apparatus of FIG. 1 according to the position of the engine throttle lever of the apparatus of FIG. 8.

Referring next to FIG. 10, the internal combustion engine throttle control mechanism is shown coupled mechanically to the voltage regulating means for film exposure lamp 38 of FIG. 1 according to the practice of this invention. Specifically, shaft 50 is taken as a torque transmitting extension of throttle lever shaft 72 to tie together the actions of throttle lever 70 and rheostat slider 39. Considering FIGS. 1, 8, and 10 together in light of the foregoing discussion of FIG. 9, it may be seen that in the engine test example here given block 44 represents the engine throttle regulating system. Further in light of the foregoing discussion of FIG. 9, a linear relation may be and accordingly is considered to exist between the angular position of throttle lever 70 and the voltage generated across output terminals $T_3$ and $T_4$ of photoelectric cell 64. Be it noted that the existence of this linear relation is in no way dependent upon the nature of the relation between the setting of throttle lever 70 and the flow rate of air to engine 68 if the engine be of the spark-ignition variety, or the flow rate of fuel if the engine be of the compression-ignition variety, that is, a diesel.

Figure 11:
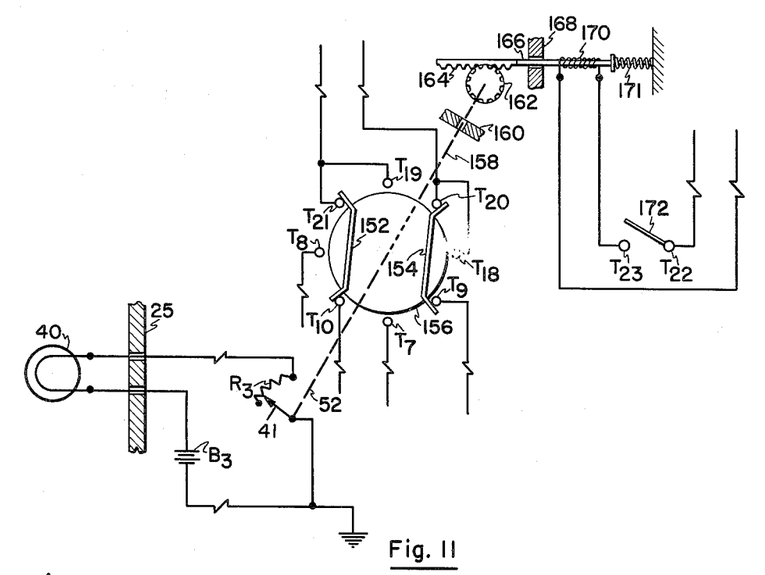
FIG. 11 represents a schematic diagram of the electrical and mechanical system for illumination intensity control of a film exposure lamp of the apparatus of FIG. 1 according to the position of the magnetizing coil current switch of the apparatus of FIG. 8.

Referring next to FIG. 11, the magnetizing coil current switch is shown coupled mechanically to the voltage regulating means for film exposure lamp 40 of FIG. 1 according to the practice of this invention. Specifically, shaft 52 is taken as a torque transmitting extension of switch disc shaft 158 to tie together the action of switch disc 156 and rheostat slider 41. In this way the action of slider 41 is tied to that of magnetizing coil current switching solenoid circuit switch lever 172 as this lever goes into and out of contact with switch point or terminal $T_{23}$. Considering FIGS. 1, 8, and 11 together in light of the foregoing discussion of FIG. 9, it may be seen that in the engine test example here given block 46 represents the magnetizing coil current switching system. Be it noted that in this case the lamp circuit rheostat itself functions essentially as a switch to cause lamp 40 to burn only either as brilliantly or as dimly as possible depending on which of the magnetizing coil current circuits is completed.

Figure 12:
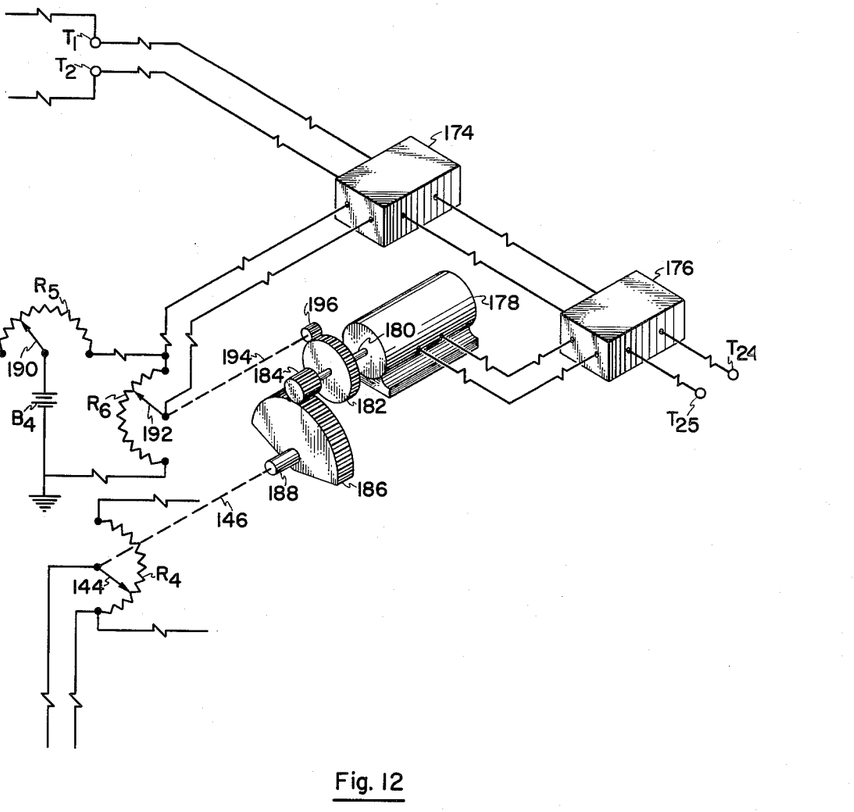
FIG. 12 represents a schematic diagram of an electrical and mechanical system for magnetizing coil current rheostat position control in the apparatus of FIG. 8 according to the voltage available across a photoelectric cell output terminal pair of the apparatus of FIG. 3.

Referring next to FIG. 12, an apparatus is shown whereby the voltage generated across output terminals $T_1$ and $T_2$ of photoelectric cell 62 is employed to regulate automatically the setting of slider 144 of the magnetizing coil current rheostat according to the practice of this invention. In this apparatus terminals $T_1$ and $T_2$ are connected to one side of a voltage comparator 174. The function of this comparator is to match the voltage impressed on it from terminals $T_1$ and $T_2$ on the one hand with that received from a balancing potentiometer or voltage divider circuit on the other, and to generate as its own output a direct voltage signal proportional to the difference between its two input voltages, this difference being known as error. The nature and control of the balancing potentiometer or voltage divider circuit which provides the second input for voltage comparator 174 will be described in greater detail presently.

The error voltage signal comprising the output of comparator 174 is taken to a direct current amplifier 176 which has a power level electrical input across terminals $T_{24}$ and $T_{25}$ from a source not shown. In this amplifier a current signal is generated of sufficient magnitude to comprise the armature current of a direct current motor 178. This motor is characterized by field poles which are permanent magnets and by an output shaft 180. Motor 178 is reversible and its direction of rotation at any given time will depend on the direction of current furnished to its armature windings from amplifier 176. The direction of this current will depend in turn upon the direction of voltage inequality or error measured by comparator 174. Likewise the magnitude of the armature current will depend upon the magnitude of the voltage error.

Output shaft 180 of motor 178 carries a gear 182 and a pinion 184. The pinion meshes with a gear sector 186 which is mounted fixedly on shaft 188, which is in turn supported rotatably in suitable bearings not shown. A rigid end-to-end connection is made between sector shaft 188 and magnetizing coil current rheostat shaft 146, knob 148 which is used for manual control of the rheostat being considered as removed for the present case of automatic control. As motor 178 is operated gear sector 186 will be turned one way or the other, and the motion of this sector will be imposed on slider 144 of the magnetizing coil current rheostat to adjust the position of this slider on rheostat resistor $R_4$.

In FIG. 12 attention should now be directed to the balancing potentiometer circuit which comprises a battery $B_4$, a slope resistor $R_5$ having a slider 190, and a voltage divider resistor $R_6$ having a slider 192. It will be convenient if $R_6$ be in the form of a ten-turn or 3600° resistor coiled in a spiral. Its slider 192 will then move in rotation, and this construction is assumed. Slider 192 is mounted fixedly on shaft 194 which is in turn supported rotatably in suitable bearings not shown. Affixed to the end of shaft 194 removed from slider 192 is a pinion 196 which meshes with gear 182 on the output shaft of motor 178. It may be seen, accordingly, that as motor 178 is operated not only will gear sector 186 be moved, but also slider 192 will be shifted on voltage divider resistor $R_6$. Shifting of slider 192 will alter the voltage input from the balancing potentiometer circuit to voltage comparator 174. In this way a feedback loop is created.

Battery $B_4$ establishes a reference voltage in the balancing potentiometer circuit. The setting of slider 190 on slope resistor $R_5$ determines the voltage available across resistor $R_6$. With more of $R_5$ in the circuit the voltage available across $R_6$ will be decreased and vice versa. With decreased voltage available across $R_6$, slider 192 must be positioned further along $R_6$ from the grounded or zero voltage end thereof to impress sufficient voltage on comparator 174 from the balancing potentiometer circuit to balance a given voltage input to the comparator from photoelectric cell 62, and hence reduce the error signal output from comparator 174 to zero. With zero output from the comparator, of course, there will be no armature current to motor 178 and gear sector 186 will be stationary. The extent of travel of gear sector 186 and hence the change in position of slider 144 on resistor $R_4$ of the magnetizing coil current rheostat in response to a given change in direct voltage imposed across terminals $T_1$ and $T_2$ will thus depend on the setting of slider 190 on slope resistor $R_5$. It is by means of slider 190 that the proper linearity factor is brought into the feedback loop to equate the motion of magnetizing coil current rheostat slider 144 under automatic control from voltages generated by photoelectric cell 62 to that of the same slider under manual control as in FIG. 9 in the course of which latter motion film was exposed according to the apparatus of FIG. 1, this film being subsequently processed, printed, and projected to energize cell 62 and create a voltage across its terminals $T_1$ and $T_2$. To obtain increased motion of magnetizing coil current rheostat slider 144 under automatic control, more of slope resistor $R_5$ should be put into the balancing potentiometer circuit, and to scale down this motion the effective value of $R_5$ in the balancing circuit should be decreased.

Figure 13:
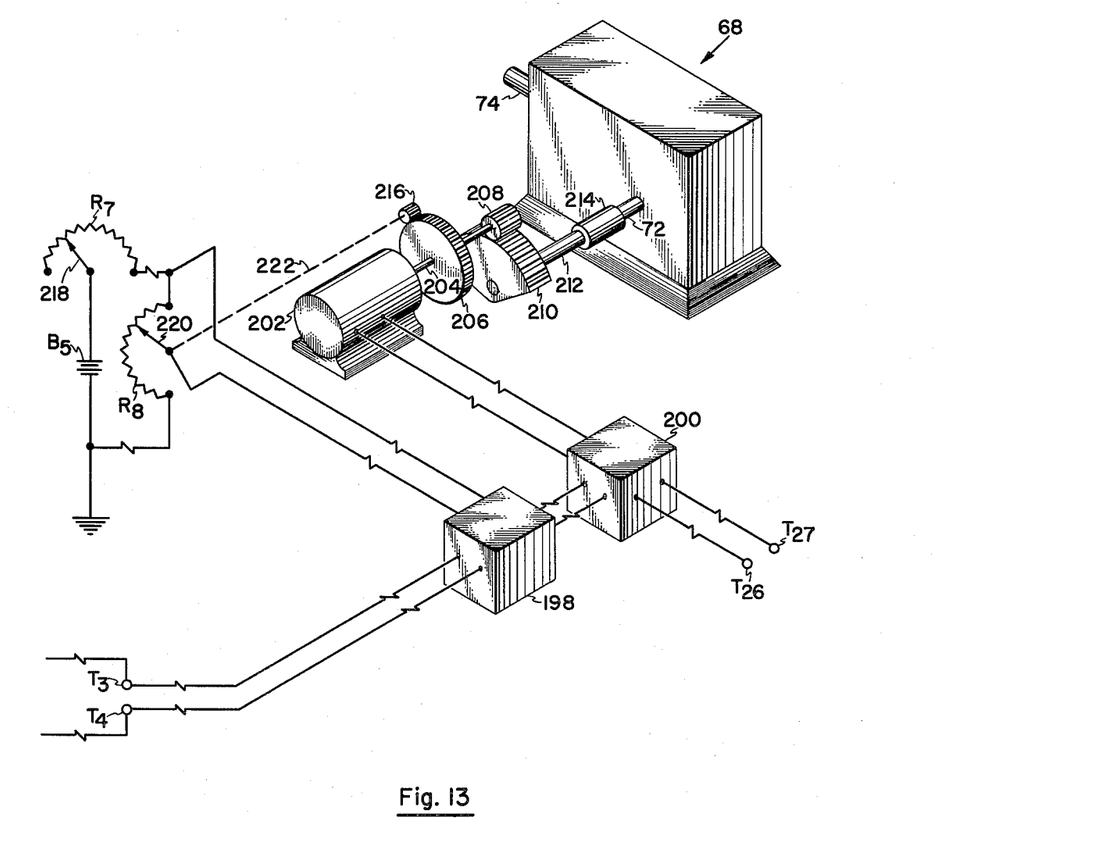
FIG. 13 represents a schematic diagram of the electrical and mechanical system for engine throttle lever position control in the apparatus of FIG. 8 according to the voltage available across a photoelectric cell output terminal pair of the apparatus of FIG. 3.

Referring next to FIG. 13, an apparatus is shown whereby the voltage generated across output terminals $T_3$ and $T_4$ of photoelectric cell 64 is employed to regulate automatically the setting of internal combustion engine throttle lever shaft 72 according to the practice of this invention. In this apparatus terminals $T_3$ and $T_4$ are connected to one side of a voltage comparator 198, and the functioning of this apparatus to adjust the setting of throttle lever shaft 72 in response to a voltage signal across terminals $T_3$ and $T_4$ is just the same as that of the apparatus of FIG. 12 to adjust the setting of magnetizing coil current rheostat slider 144 in response to a voltage signal across terminals $T_1$ and $T_2$. Apparatus components appearing in FIG. 13 include the following: a direct current amplifier 200, power supply terminals $T_{26}$ and $T_{27}$ for amplifier 200, a direct current motor 202, motor output shaft 204, gear 206 on shaft 204, pinion 208 on shaft 204, gear sector 210 meshed with pinion 208, gear sector shaft 212, sleeve coupling 214 joining gear sector shaft 212 and engine throttle lever shaft 72 with engine throttle lever 70 removed, pinion 216 meshed with gear 206, reference voltage battery $B_5$, slope resistor $R_7$ having slider 218, voltage divider resistor $R_8$ having slider 220, and shaft 222 connecting pinion 216 and slider 220.

Figure 14:
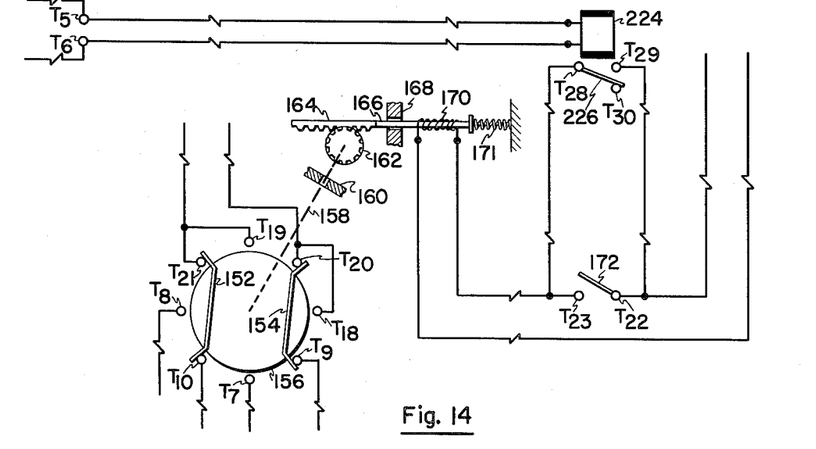
FIG. 14 represents a schematic diagram of the electrical and mechanical system for magnetizing coil current switch position control in the apparatus of FIG. 8 according to the voltage available across a photoelectric cell output terminal pair of the apparatus of FIG. 3.

Referring next to FIG. 14, an apparatus is shown whereby the voltage generated across output terminals $T_5$ and $T_6$ of photoelectric cell 66 is employed to regulate automatically the energization of magnetizing coil current switching solenoid coil 170 according to the practice of this invention. In this apparatus, a relay comprising magnetic element 224, swinging contact element 226, active terminals $T_{28}$ and $T_{29}$, and rest terminal $T_{30}$ is connected across terminals $T_{22}$ and $T_{23}$ of the magnetizing coil current switching solenoid circuit switch. The windings of relay magnetic element 224 are connected across photoelectric cell output terminals $T_5$ and $T_6$. It is to be understood that any conventional direct current amplification apparatus may be installed between magnetic element 224 and terminals $T_5$ and $T_6$ to provide sufficient current in the magnetic element windings for proper relay action should voltage signals available across the photoelectric cell terminals be inadequate by themselves for this purpose.

The normal attitude of the relay will be with swinging element 226 at rest on terminal $T_{30}$ corresponding to an open condition of the magnetizing coil current switching solenoid circuit switch lever 172 across terminals $T_{22}$ and $T_{23}$, and to energization of the engine motoring coil 122. When the relay is energized by a signal from photoelectric cell output terminals $T_5$ and $T_6$, its swinging element will be pulled in across terminals $T_{28}$ and $T_{29}$ to complete the solenoid circuit through coil 170. The resulting solenoid action will rotate switch disc 156 clockwise to interrupt the magnetizing current circuit of the engine motoring coil 122, and complete the magnetizing current circuit of the engine loading coils 112.

Referring finally to FIGS. 1 through 14 as a group, it may be seen that the stated general and particular objects of this invention, namely, in brief, to provide first a system for controlling operating equipment and processes automatically according to a predetermined program using a recording method and means employing photographic film, and second a method and means of automatic control using a photographic film record for dynamometric testing of an internal combustion engine, have been achieved fully according to the foregoing description. Although this invention has been described with a certain degree of particularity, it is to be understood that the present disclosure has been made only by way of example and that numerous changes in the details of construction and the combination and arrangement of parts may be resorted to without departing from the spirit and scope of this invention as hereinafter claimed.

What is claimed is:

1. A method for imposing automatic operating control according to a predetermined program on an internal combustion engine and an eddy current dynamometer coupled thereto, said engine being characterized by a throttle mechanism and a first control device for regulating the setting thereof and said dynamometer being characterized by at least two magnetizing current coils, one associated only with the function of supplying motoring power to said engine and another associated only with the function of absorbing combustion power output from said engine, a second control device for directing magnetizing current to the coil for motoring and the coil for power absorbing alternately, and a third control device for regulating the magnitude of current in whichever of said coils is energized according to the setting of said second control device, which comprises operating said engine and dynamometer under the influence of said first, second, and third control devices manually adjusted as necessary to obtain operating results according to said predetermined program; modulating the intensity of exposure of moving photographic film in a camera means according to the displacements of said control devices to obtain three film exposure tracks of light transmission densities as developed corresponding separately to the displacement of each control device as adjusted manually; developing said film; connecting an electrically actuated mechanical positioning means to each of said control devices and further connecting each such positioning means to the output terminals of at least one separate photoelectric cell; passing said developed film through a projecting means, and directing light transmitted through each film exposure track to impinge upon the photoelectric cell connected to the mechanical positioning means in turn connected to the control device according to the displacement of which by manual adjustment the particular exposure track was obtained whereby a voltage is generated actuating said positioning means to adjust said control device automatically.

2. A method according to claim 1 in which said film is developed to a negative; at least one positive print made therefrom, and said positive print passed through said projecting device.

3. A method according to claim 1 in which said throttle mechanism regulates the flow of combustion air to said internal combustion engine.

4. A method according to claim 1 in which said throttle mechanism regulates the flow of fuel to said internal combustion engine.

References Cited in the file of this patent

UNITED STATES PATENTS

| | | |
|---|---|---|
| 2,248,938 | Bennett | July 15, 1941 |
| 2,438,026 | Wrathall | Mar. 16, 1948 |
| 2,475,245 | Leaver et al. | July 5, 1949 |
| 2,485,839 | O'Dea | Oct. 25, 1949 |
| 2,537,770 | Livingston et al. | Jan. 9, 1951 |
| 2,669,870 | Bennett | Feb. 23, 1954 |
| 2,882,475 | De Neergaard | Apr. 14, 1959 |